US008924740B2

(12) United States Patent
Yu

(10) Patent No.: US 8,924,740 B2
(45) Date of Patent: Dec. 30, 2014

(54) ENCRYPTION KEY TRANSMISSION WITH POWER ANALYSIS ATTACK RESISTANCE

(75) Inventor: Shu-Yi Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 13/314,420

(22) Filed: Dec. 8, 2011

(65) Prior Publication Data
US 2013/0151842 A1    Jun. 13, 2013

(51) Int. Cl.
*H04L 9/00* (2006.01)

(52) U.S. Cl.
USPC .......................................... 713/189; 380/259

(58) Field of Classification Search
None
See application file for complete search history.

(56) References Cited

U.S. PATENT DOCUMENTS

| | | | | |
|---|---|---|---|---|
| 6,633,951 B2 * | 10/2003 | Cohen | ............................ | 711/105 |
| 7,086,087 B1 * | 8/2006 | Kaminaga et al. | .............. | 726/16 |
| 7,295,671 B2 | 11/2007 | Snell | | |
| 7,616,133 B2 * | 11/2009 | Hollis | ............................. | 341/58 |
| 7,636,691 B2 * | 12/2009 | Maari | ............................. | 705/51 |
| 7,636,842 B2 * | 12/2009 | Kumoluyi et al. | ............ | 713/166 |
| 8,094,045 B2 * | 1/2012 | Hollis | ............................. | 341/58 |
| 8,094,811 B2 * | 1/2012 | Yokota et al. | ................... | 380/28 |
| 8,296,577 B2 * | 10/2012 | Shu et al. | ......................... | 713/189 |
| 8,483,311 B2 * | 7/2013 | Varteva | ......................... | 375/295 |
| 2003/0140240 A1 | 7/2003 | Jaffe et al. | | |
| 2003/0223580 A1 | 12/2003 | Snell | | |
| 2005/0201552 A1 | 9/2005 | Arisawa et al. | | |
| 2006/0126828 A1 * | 6/2006 | Yoon et al. | ...................... | 380/28 |
| 2010/0086126 A1 * | 4/2010 | Yokota et al. | .................. | 380/28 |
| 2010/0250943 A1 * | 9/2010 | Berry et al. | ...................... | 713/172 |
| 2011/0019765 A1 * | 1/2011 | Varteva | ......................... | 375/295 |
| 2011/0292711 A1 * | 12/2011 | Tan et al. | ........................ | 365/96 |
| 2012/0036371 A1 | 2/2012 | Hayek | | |
| 2012/0174234 A1 * | 7/2012 | Bancel | ............................ | 726/26 |

FOREIGN PATENT DOCUMENTS

WO    WO 00/19385    *   4/2000   ................ G06F 7/10

OTHER PUBLICATIONS

Ratanpal, G.B.; Williams, R.D, "An On-Chip Signal Suppression Countermeasure to Power Analysis Attacks", IEEE Transactions on Dependable and Secure Computing, Jul.-Sep. 2004 pp. 179-189.
Standaert, O.-X.; Peeters, E.; Rouvroy, G.; Quisquater, J.-J.; "An Overview of Power Analysis Attacks Against Field Programmable Gate Arrays" Lab. de Microelectronique, Univ. Catholique de Louvain, Louvain-la-Neuve, Belgium, Proceedings of the IEEE, Feb. 2006 vol. 94 Issue:2 pp. 383-394.

(Continued)

*Primary Examiner* — Christopher Revak
(74) *Attorney, Agent, or Firm* — Rory D. Rankin; Meyertons, Hood, Kivlin, Kowert & Goetzel, P.C.

(57) ABSTRACT

Methods and mechanisms for transmitting secure data. An apparatus includes a storage device configured to store data intended to be kept secure. Circuitry is configured to receive bits of the secure data from the storage device and invert the bits prior to transmission. The circuitry may invert the bits prior to conveyance if more than half of the bits are a binary one, set an inversion signal to indicate whether the one or more bits are inverted, and convey both the one or more bits and inversion signal. Embodiments also include a first source configured to transmit Q bits of the secure data on an interface on each of a plurality of clock cycles. The first source is also configured to generate one or more additional bits to be conveyed concurrent with the Q bits such that a number of binary ones transmitted each clock cycle is constant.

12 Claims, 7 Drawing Sheets

(56) References Cited

OTHER PUBLICATIONS

Ambrose, J.A.; Ragel, R.G.; Parameswaran, S.; Ignjatovic, A.; "Multiprocessor Information Concealment Architecture to Prevent Power Analysis-Based Side Channel Attacks" Computers & Digital Techniques, IET, vol. 5 Issue: 1 pp. 1-15.

Ambrose (2007). A Smart Random Code Injection to Mask Power Analysis Based Side Channel Attacks, ACM.

* cited by examiner

ENCRYPTION KEY TRANSMISSION WITH POWER ANALYSIS ATTACK RESISTANCE

BACKGROUND

1. Technical Field

This disclosure relates generally to processors, and, more specifically, to data transmissions and data security.

2. Description of the Related Art

Computing system, whether they be desktop computers, laptop computers, personal digital assistants, smart phones, tablet computers, television set top boxes, gaming consoles, or otherwise, often use or convey data which is intended to remain confidential. Such data may represent sensitive financial information, copyright protected data such as music or movies, personal customer data such as names, addresses, social security numbers, passwords, and so on. In order to prevent unauthorized access to particular data, such systems often use techniques such as encryption to protect the data. Encryption generally entails encoding the data according to a particular algorithm such that should the data be captured or discovered it cannot be decoded without the proper keys.

In order to encrypt data, systems often include encryption mechanisms built into the system and may also have the keys necessary to encrypt and decrypt data stored in the system. For example, such keys may be stored in memory/storage device such as an electronic fuse (variously referred to as an efuse, eFUSE, eFuse, etc.) array. When the system is reset, rebooted, or otherwise prepared for operation, these keys may be read out of the storage device and conveyed to the various components and/or units which use them. As the transmission of these keys may generally occur when system operation is just being started (or restarted), it may be the case that there is little other activity occurring within the system when these keys are being read out and conveyed to the appropriate units. Because of this, there is a risk of the keys being identified by those seeking to gain unauthorized access to the keys and the data which they secure.

One approach such hackers may use to identify encryption keys is differential power analysis. Generally speaking, differential power analysis involves analyzing the power consumption characteristics of a computing device during data transfers. Based on such analysis, the nature of the data being transferred may be discerned. In a system in which secure data (such as encryption keys) is transmitted while there is little other system activity, it may be easier to isolate and determine the characteristics of the secure data. This in turn may make it easier for hackers, and other unauthorized persons, to gain access to the secure data.

In view of the above, methods and mechanisms for protecting data are described herein.

SUMMARY OF DISCLOSURE

Methods and mechanism for transmitting secure data are contemplated and disclosed.

In one embodiment, an apparatus is contemplated that includes a storage device configured to store data intended to be kept secure. In various embodiments, data intended to be kept secure may include encryption key data which is used to for encrypting and/or decrypting data. In one embodiment the apparatus includes circuitry configured to receive secure data from the storage device. The circuitry conditionally inverts the secure data prior to transmission to a receiving unit for further use. In various embodiments, the circuitry is configured to invert the one or more bits prior to conveyance if more than half of the one or more bits are a binary one value. Additionally, the circuitry may set an inversion signal to indicate whether the one or more bits have been inverted. The one or more bits may then be conveyed along with the inversion signal that indicates whether the data bits have been inverted. Responsive to receiving the bits and the inversion signal, a receiving unit checks the inversion signal to determine whether the received data was inverted prior to its conveyance.

Also contemplated are embodiments of an apparatus including a storage device configured to store secure data. The apparatus includes a first source configured to convey bits of the secure data. In various embodiments, the first source is configured to transmit Q bits of the secure data on an interface on each of a plurality of clock cycles. In addition, the first source is configured to generate one or more additional bits to be conveyed concurrent with the Q bits such that a number of binary ones included in the Q bits and additional bits transmitted each clock cycle is constant. Additionally, the circuitry may be configured to generate the additional bits such that the number of bits in the Q bits and additional bits which toggle each clock cycle remains constant.

These and other methods and mechanism are contemplated and will be appreciated from the following description and accompanying figures.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, reference to a "first" DMA operation does not necessarily imply that this operation is an initial DMA operation relative to some time frame; instead the term "first" is used to differentiate this operation from another DMA operation (e.g., a "second" DMA operation).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
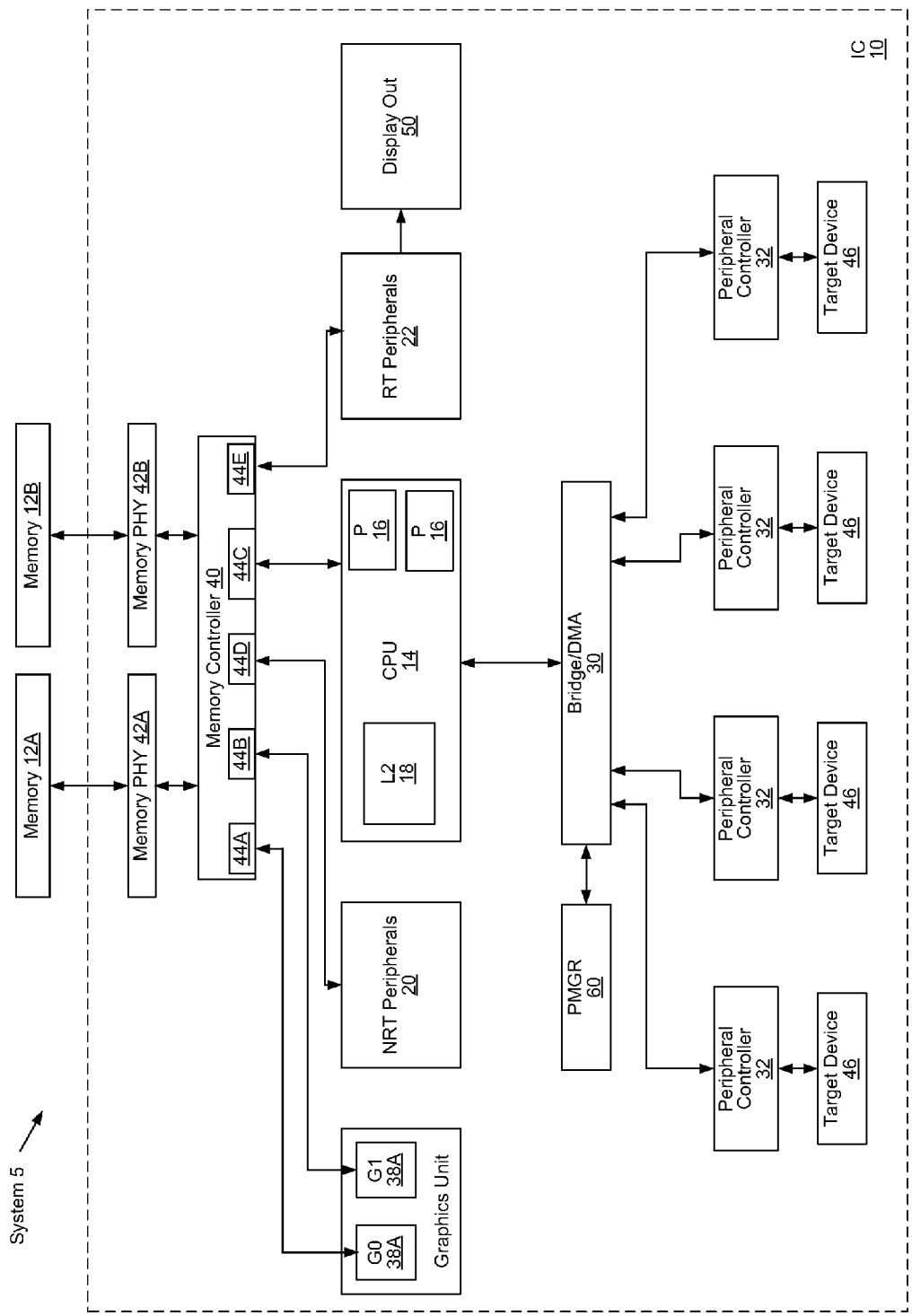
FIG. 1 is a block diagram illustrating one embodiment of an integrated circuit.

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional caches. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. Display out 50 represents one of many possible types of real time peripherals. In the illustrated embodiment, the CPU block 14 is coupled to a bridge/direct memory access (DMA) controller 30, which may be coupled to one or more target devices 46 and/or one or more peripheral controllers 32. The number of target devices 46 and peripheral controllers 32 may vary in different embodiments. Also shown is a power manager unit (PMGR) 60 coupled to Bridge/DMA 30. PMGR 60 may be configured to perform various functions related to system reset and initialization, and power management. In various embodiments, PMGR 60 may further be configured to provide security related functions, including the provision of encryption/decryption keys to Bridge/DMA 30 unit and/or other units within system 5. Such encryption/decryption keys may be used for various cryptographic purposes.

System 5 illustrated in FIG. 1 further includes a graphics unit 36 including one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B.

The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1. The number of memory PHYs 42A-42B and corresponding memories 12A-12B may be one or more than two in other embodiments.

Generally, a port may be a communication point on the memory controller 40 configured to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E. Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as target devices 46 and/or peripherals coupled to a peripheral interface controlled by the peripheral controller 32 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may include circuitry to bridge the target device(s) 46 and the peripheral controller(s) 32 to the memory space. In the illustrated embodiment, the bridge/DMA controller 30 may bridge the memory operations from the peripherals/peripheral controllers through the CPU block 14 to the memory controller 40 or directly to the memory controller 40 (not shown) or NRT peripherals 20 (not shown). The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operations on behalf of the peripherals/target devices 46 and the peripheral controllers 32 to transfer blocks of data to and from memory. More particularly, the DMA controller may be configured to perform transfers to and from the memory 12A-12B through the memory controller 40 on behalf of the target devices 46 and the peripheral controllers 32. The DMA controller may be programmable by the processors 16 to perform the DMA operations. For example, the DMA controller may be programmable via descriptors and registers in the DMA controller (not shown in FIG. 1). The descriptors may be data structures stored in the memory 12A-12B that describe DMA transfers (e.g. source and destination addresses, size, etc.).

Peripherals/target devices 46 may include any desired input/output devices or other hardware devices that are included on the integrated circuit 10. For example, target devices 46 may include networking peripherals such as one or more networking media access controllers (MAC) such as an Ethernet MAC or a Wifi (IEEE 802.11b,g,n) controller. An audio unit including various audio processing devices may be included in target devices 46. One or more digital signal processors may be included in the target devices 46. Target devices 46 may include any other desired function such as timers, an on-chip secrets memory, an encryption engine, etc., or any combination thereof.

Peripheral controller 32 may include controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc. Peripheral controller 32 may include multiple buffers, such as ping-pong buffers. Multiple buffers may allow simultaneous reads and writes to peripheral controller 32. For example, a peripheral/target device 46 may fill one buffer at the same time a PIO operation sets up a DMA operation in another buffer. Data may be alternately read from these buffers (thus "ping-ponging" back and forth between them).

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
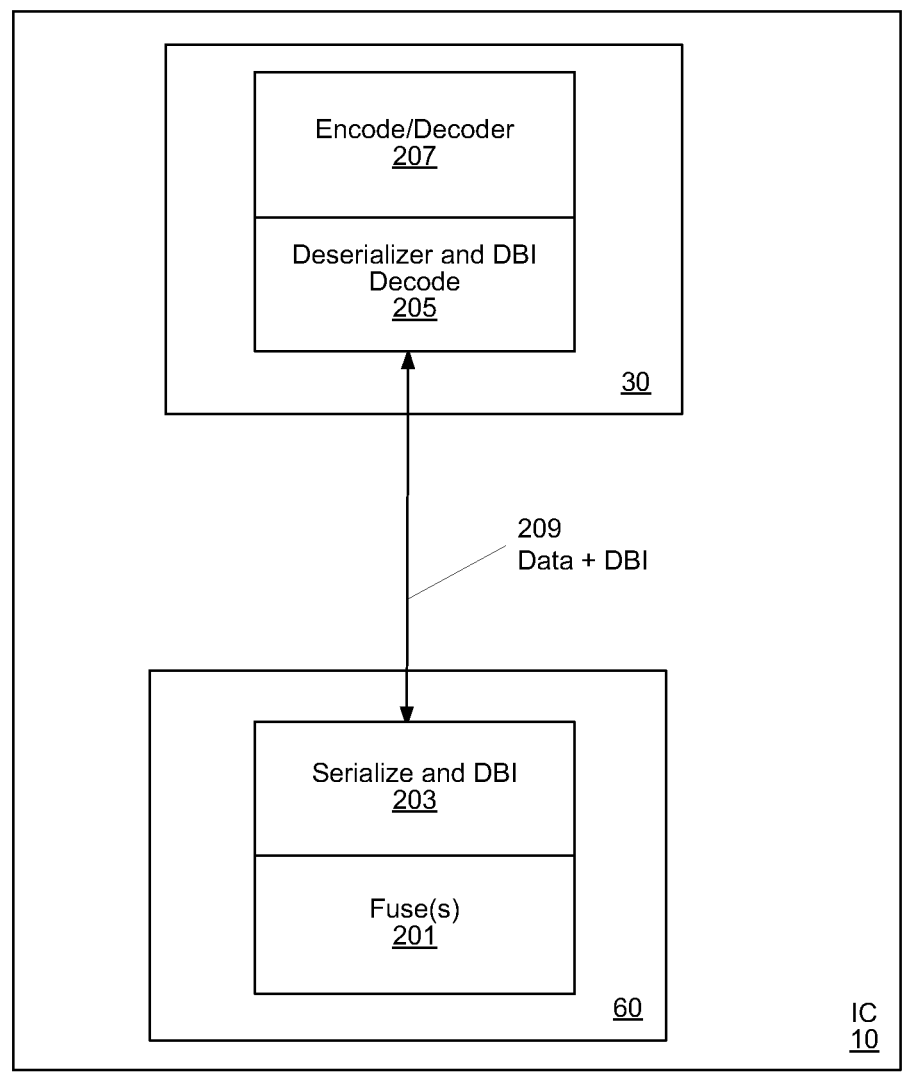
FIG. 2 is a block diagram of one embodiment of a portion of the circuit of FIG. 1.

FIG. 2 illustrates one embodiment of a portion of the IC 10 of FIG. 1. As previously noted, PMGR 60 may be configured to provide encryption related data to one or more other portions of the system 5. In the following, for ease of discussion, the transmission of sensitive data from one unit to another is described in terms of transmission from PMGR 60 to BDMA 30. However, the methods and mechanisms described herein are equally applicable when transmitting data from any of a variety of units/components to another. In the following examples, the transmission of encryption key data from one unit to another (or others) will be described. It may be desired that the data stored within efuse 201 remain confidential. For example, in various embodiments, efuses 201 may comprise an array of storage devices used to store encryption keys (or other types of data used to secure other data). These keys are then used within a corresponding system to encrypt data and generally provide data security. Should the values of these keys be discovered, security mechanisms in the system may be defeated and access to confidential or otherwise protected data may be possible. As noted above, one technique utilized by those seeking to discover values of secure data in electronic systems is differential power analysis (DPA). As used herein, "secure data" generally refers to any data which is desired to be kept confidential (secret) or non-public. By analyzing a system in various states of operation, characteristics of power consumption may reveal details regarding when and what data is being transmitted within the system. In this manner, cryptographic keys and other secret information may be obtained.

FIG. 2 illustrates PMGR 60 includes electronic fuses (efuses) 201 and logic 203 that may be configured to serialize efuse data and generate one or more data bus inversion (DBI) signals. Efuse data and one or more DBI signals are then conveyed via lines 209 to BDMA 30. BDMA 30 includes logic 205 configured to deserialize efuse data and logic 207 configured to use received encryption key data for use in encrypting and/or decrypting data. In one embodiment, the DBI signal may be used to indicate data on the bus 209 has been inverted. In various embodiments, the encryption key data transmitted on the bus may be selectively inverted so that the total number of 1 s transmitted at one time does not exceed half of the data. In some embodiments, PMGR 60 is configured to convey encryption key data (or other sensitive data) to BDMA 30 via data lines 209. In various embodiments, only a few bits of the encryption keys are conveyed on each of multiple clock cycles as will be discussed in greater detail below.

For example, in one embodiment, on transmitter's side 60, N-bits of data may be transmitted per clock cycle. A single bit DBI may be used to indicate that the total number of 1 s in the N-bits is more than half of the bits and the bits have been invereted (e.g., if N=4, then DBI may be used to indicate when 3 or 4 of the N bits are 1). When more than half of the N bits are 1, then the N bits are inverted prior to being conveyed on bus 209. In addition to conveying the N bits, the DBI signal is conveyed with the N bits. On the receiver's side 60, logic 205 received the N bits of data and the DBI signal. If the DBI signal is asserted (or otherwise indicates the data has been inverted), then the logic 205 inverts the N data bits to restore the original uninverted values. By inverting the keys based on the number of 1 s, the total number of 1 s may remain less than half of the total bits transmitted. This may in turn reduce the number of toggling bits and the number of 1 s, and reduce the power signature for side-channel attacks. In the embodiment described above, the total overhead is 1/N. For example, if a 1-bit DBI is used on a 4-bit key transmission, then the total number of wires may be 5, which makes an overhead of 25%.

It is noted that N can be chosen differently based on the hardware and security trade-offs. For example, by choosing N=1 for the 4 bits of data transferred as discussed above, a total of 4 bits of DBI are used. In such an embodiment, each DBI may be the inversion of the original data as follows:

DBI[0]=~data[0]

DBI[1]=~data[1]

DBI[2]=~data[2]

DBI[3]=~data[3]

In such an embodiment, eight wires may be used to transmit the data and DBI signals (~data[3:0], data[3:0]). Utilizing such an approach, the total number of 1 s and 0 s are always a constant, which may in turn provide improved power analysis resistance.

Figure 3:
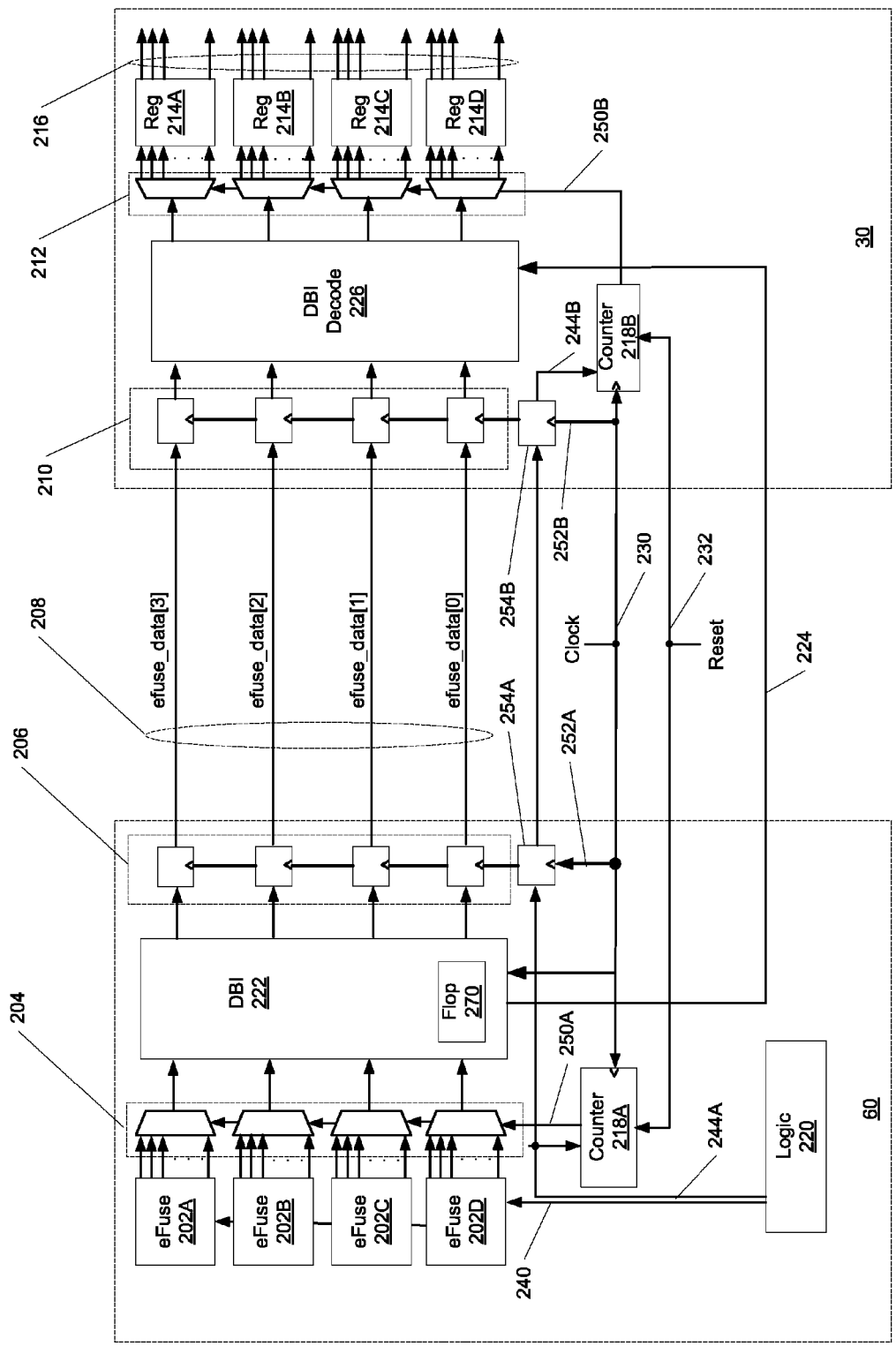
FIG. 3 depicts one embodiment of an efuse data transmission apparatus.

Turning now to FIG. 3, one embodiment of PMGR 60 and BDMA 30 is shown. As noted above, the methods and mechanisms described herein may be applied to units other than PMGR 60 and BDMA 30. PMGR 60 is shown to include efuse arrays 202A-202D which are configured to store bits of the encryption keys and are coupled to convey bits of the keys to BDMA 30. In the embodiment shown, the bits of the keys are conveyed via a multiplexer(s) 204 to DBI logic 222. DBI logic 222 is configured to convey efuse related data to a flip-flop(s) 206 or other suitable device configured to capture data. For ease of discussion, as used herein reference numerals followed by letters (e.g., array 202A, array 202B) may be collectively referred to by the reference number alone (e.g., arrays 202).

BDMA 30 in FIG. 3 is shown to include flip flops 210 coupled to capture data conveyed via data lines 208. In various embodiments, data lines 208 are serial data lines. Data captured by these flip flops 210 is then conveyed via to DBI decode logic 226, which in turn may convey data via a multiplexer(s) 212 to a corresponding register 214A-214D. Also shown in FIG. 3 are counters 218A and 218B coupled to receive a clock signal 230. In one embodiment, counters 218A and 218B are configured to increment each cycle of clock signal 230 and convey a corresponding count as a selection signal(s) (250A and 250B) to each of multiplexers 204 and 212, respectively. In addition, counters 218 may be coupled to receive an enable signal (244A and 244B) operable to enable or disable counter operation. In the embodiment shown, counter 218A is coupled to receive an enable signal 244A from logic 220, and counter 218B is coupled to receive an enable signal 244B from flip-flop 254B.

In one embodiment, each of efuse arrays 202A-202D stores 128 bits of an encryption key. These 512 bits may represent one or more keys. In one embodiment, efuse arrays 202 store two 256 bit keys. For example, each of efuse arrays 202A and 202B may store 128 bits of one 256 bit key, while efuse arrays 202C-202D each store 128 bits of a second 256 bit key. In one embodiment, each of multiplexers 204 is a 128:1 multiplexer configured to convey one of 128 signals.

In one embodiment, DBI logic 222 is configured to receive data bits from efuse arrays 202 via multiplexors 204. In response to determining the number of data bits received which are asserted (e.g., in a given clock cycle) is more than half of the number of bits received, DBI logic 222 inverts the data bits before conveying them to flip-flops 206. Additionally, a signal 224 is used to indicate whether the data bits have been inverted. DBI logic 222 may include one or more flip-flops 270 for capture of DBI signal 224 prior to conveyance to unit 30.

The data captured by the flip flops 206 is then conveyed via data lines 208 concurrently. In this manner, four bits of the key(s) are transmitted at a time over each of 128 clock cycles. In the embodiment shown, logic 220 may be configured to convey a shift signal 240 coupled to efuses 202 to indicate which bit of a key(s) is to be conveyed. For example, efuses 202 may include a shift register configured to serially output bits of a key. In various embodiments, shift signal 240 may not directly identify a particular bit to be conveyed, but enable shift register operation within efuses 202 for conveyance of given bits.

As seen in the embodiment of FIG. 3, clock signal 230 is coupled to both increment counters 218 and to clock flip flops 206, 210 and 252A-252B. Data conveyed via data lines 208 is captured by BDMA 30 via flip flops 210. Values stored in these flip flops 210 are then conveyed via multiplexers 212 to DBI decode logic 226. In addition, DBI decode logic 226 receives the DBI signal(s) 224 generated by the DBI logic 222. If the received DBI signal 224 indicates the data bits conveyed have been inverted, DBI decode logic 226 again inverts the received data bits to restore their original uninverted values. DBI decode logic 226 then conveys the data bits to registers 214A-214D via multiplexors 212. In one embodiment, each of registers 214A is configured to store 128 bits. After key transmission has successfully completed, the values 216 captured by these registers represents the encryption keys originally stored within efuse arrays 202. These values 216 may then be used within unit 30 and/or elsewhere (even conveyed elsewhere if desired). Similar to the counter 218A in PMGR 60, counter 218B is incremented each clock cycle and provides a selection signal to each of multiplexers 212. In one embodiment, each of counters 218 is a seven bit counter configured to cycle through values 0-127. In the embodiment shown, a reset signal 232 is shown coupled to each of counters 218. Using the reset signal 232, values stored in each of counters 218 may be initialized to a desired value (e.g., zero).

Figure 4:
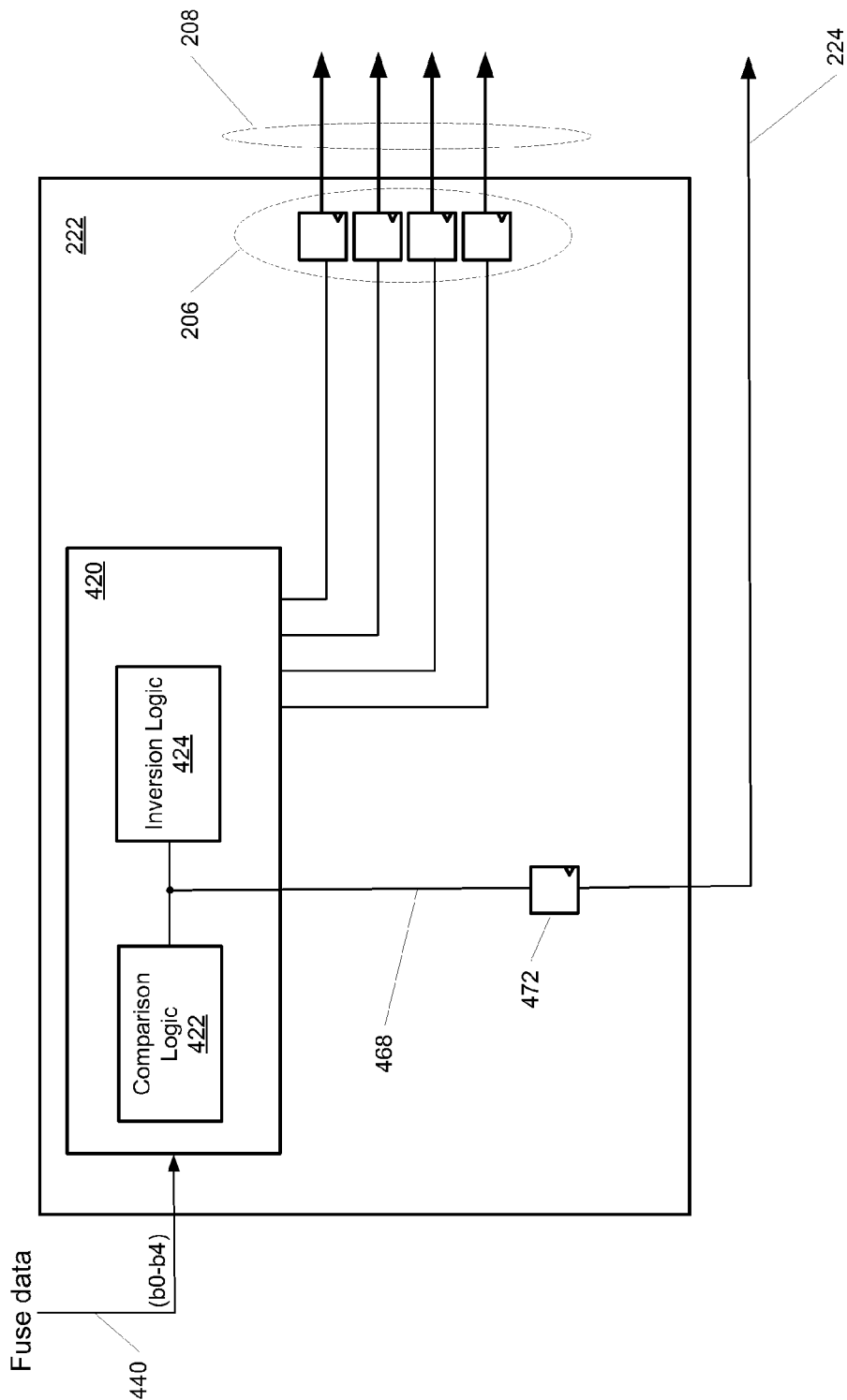
FIG. 4 depicts one embodiment of a portion of the apparatus shown in FIG. 4.

Turing now to FIG. 4, one embodiment of a portion of logic included within DBI unit 222 is shown. In the example shown, DBI logic 222 includes circuitry 420 coupled to receive efuse data 440. Circuitry 420 is configured to convey data bits to flip-flops 206 which may then be conveyed as data 208. In addition, DBI logic 222 is configured to convey a signal 468 may be captured by flip-flop(s) 472 prior to being conveyed as DBI signal(s) 224. As previously mentioned, flops 270 may be clocked by clock 230 as shown in FIG. 3.

In various embodiments, circuitry 420 includes comparison logic 422 and inversion logic 424. In one embodiment, comparison logic 422 is configured to receive data bits 440 and determine if more than half of the received bits are 1. If more than half of the received bits are one, signal 468 indicates this. In addition, if more than half of the received bits are 1, then inversion logic 424 is configured to invert the received data bits. The data bits 440 (uninverted or inverted as described) are then captured by flip-flops 206. The data 208 and DBI signal 224 is conveyed to a receiving unit as previously discussed where the data may be inverted as appropriate to undo the inversion applied by the logic 424.

Figure 5:
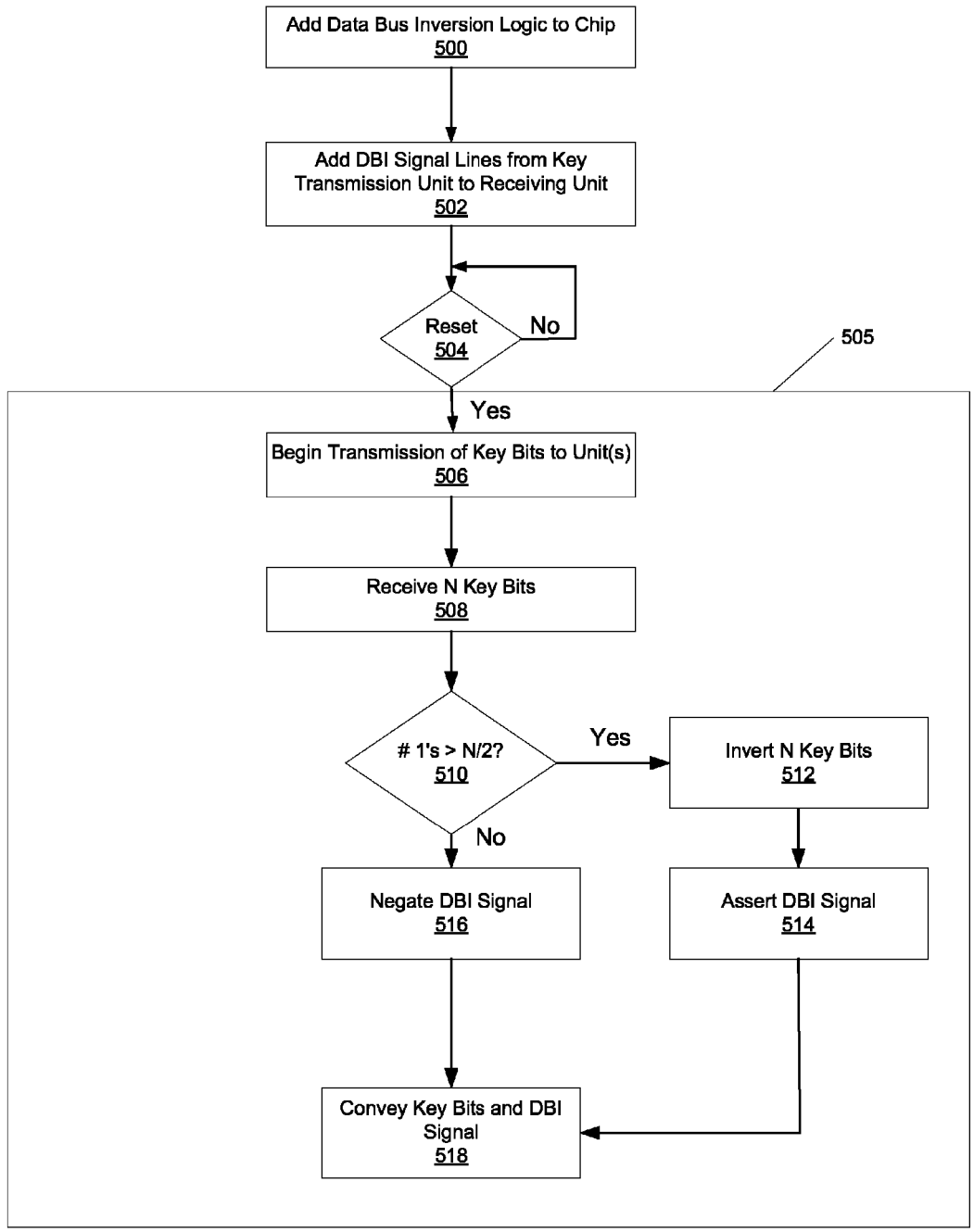
FIG. 5 is one embodiment of a method for transmitting data.

FIG. 5 illustrates one embodiment of a method in accordance with the above described methods and mechanisms. In the method of FIG. 5, data bus inversion logic may be added to a given chip (block 500). Alternatively, existing logic within a given chip may be used for performing the described functions. For example, an existing design may already include various elements which may be used for such a purpose (e.g., comparators, inverters, etc.). In addition, DBI signal lines are added to the chip (block 502). These new lines are configured to convey an indication as to whether associated data has been inverted.

During operation, a reset signal (decision block 510) may be asserted. Responsive to the reset signal, units associated with the transmission of secure data (such as encryption key data) may be initialized. After initialization, a secure data transmission procedure may be initiated (block 505). Transmission of one or more secure data bits may then begin (block 506). N key bits may then be received (block 508) by logic such as DBI logic discuss above, and a comparison made as to whether more than half of the bits are 1 s (conditional block 510). If the comparison is true, then the N key bits are inverted (block 512), the DBI signal is asserted (or otherwise set to indicate inversion of the data bits) (block 514), and the data bits as inverted along with the DBI signal conveyed to a receiving unit (block 518). On the other hand, if the condition of block 510 is false, then the DBI signal is negated and the data bits along with the DBI signal conveyed to a receiving unit (block 518). Transmission of data and DBI bits as shown in block 505 may continue until the transmission is complete or some other condition occurs to interrupt the transmission (e.g., detection of a reset).

As discussed above, other embodiments may operate differently from the embodiments of FIGS. 4 and 5. For example, there may be a DBI bit associated with each data bit that is transmitted. For example, if N key bits are transmitted at a time, then N bits of DBI may be used. In such an embodiment, each DBI may be the inversion of the original data as follows:

DBI[0]=~data[0]

DBI[1]=~data[1]

DBI[2]=~data[2]

DBI[3]=~data[3]

In such an embodiment, eight wires may be used to transmit the data and DBI signals (~data[3:0], data[3:0]). Utilizing such an approach, the total number of 1 s and 0 s are always a constant, which may in turn provide improved power analysis resistance. Such an embodiment is illustrated by FIG. 6.

Figure 6:
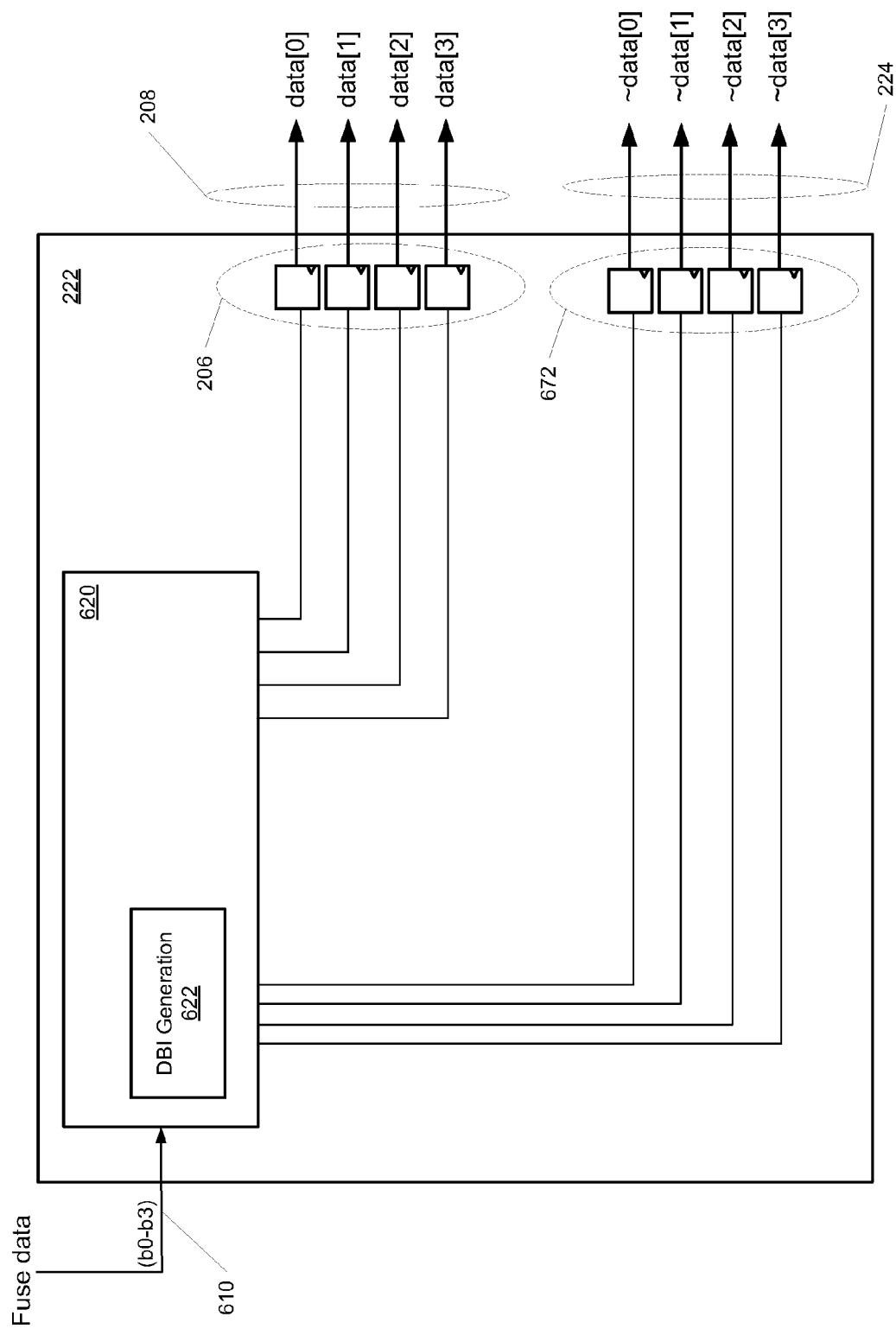
FIG. 6 depicts one embodiment of circuitry for use in transmitting efuse data.

FIG. 6 shows DBI logic 222 configured to receive secure data bits (610). Similar to FIG. 4, logic 222 includes flip-flops 206 which convey data 208. Also included in logic 22 is logic or circuitry 620 including DBI generation logic 622. In this embodiment, DBI generation logic 622 generates new signals corresponding to each received data bit 610. In one embodiment, data bits 610 are conveyed as data 208 (data[0]-data [3]). DBI generation 622 creates a corresponding inverted bit for each of these data bits to form ~data[0]-~data[3] which is conveyed as data 224. Data 208 and 224 are conveyed simultaneously.

Figure 7:
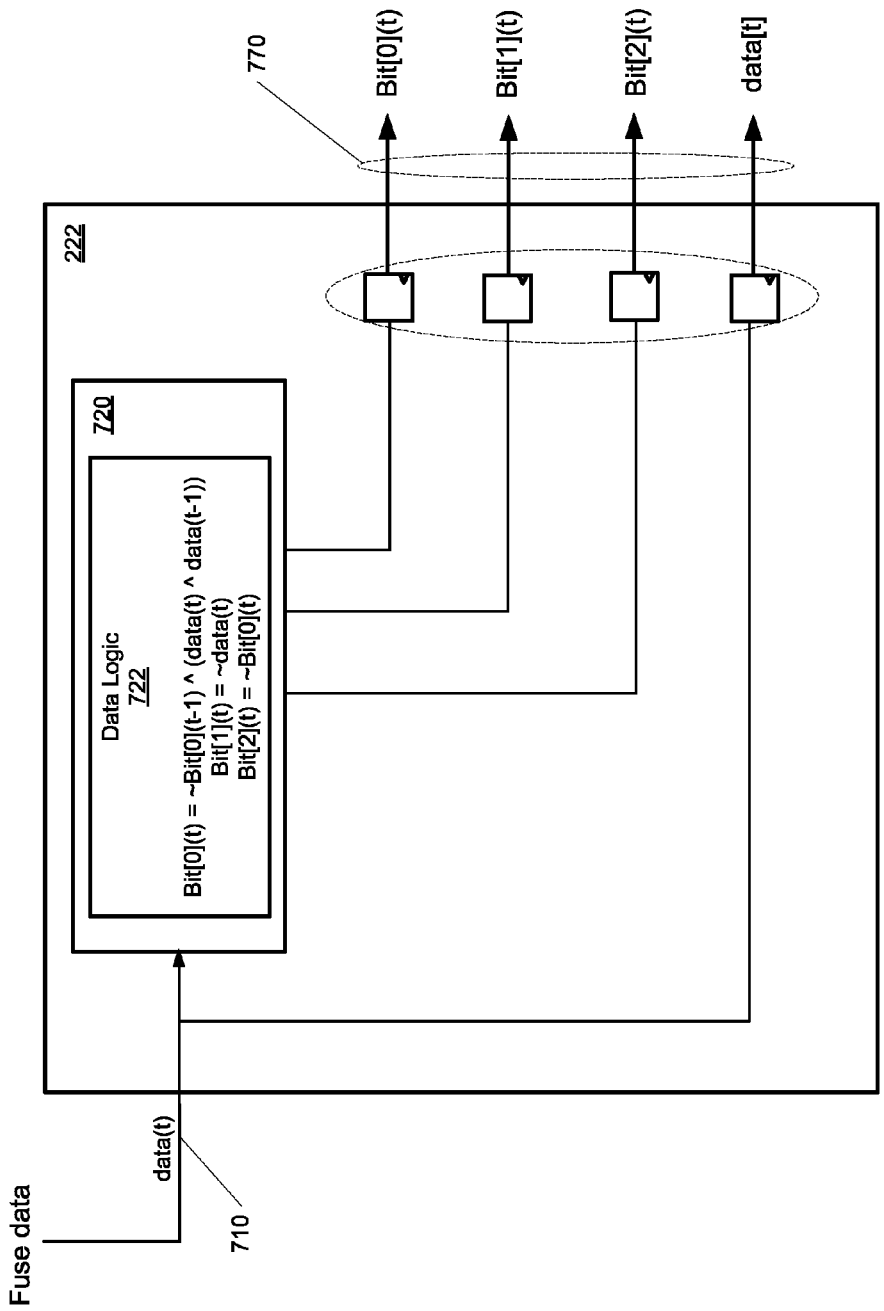
FIG. 7 depicts one embodiment of circuitry for use in transmitting efuse data.

FIG. 7 illustrates another embodiment. As may be appreciated by those skilled in the art, CMOS power comprises static power and dynamic power. The approach presented here addresses both the number of 1 s and 0 s transmitted, and the total amount of toggling. In this embodiment, for each bit of data 3 additional signals are transmitted as following:

$$Bit[0](t)=\sim Bit[0](t-1)^\wedge(data(t)^\wedge data(t-1))$$

$$Bit[1](t)=\sim data(t)$$

$$Bit[2](t)=\sim Bit[0](t).$$

where data represents the data bit, Bit represents a newly generated bit, and t indicates the clock cycle.

In this embodiment, Bit [0] toggles when data does not toggle. This makes the total amount of toggling per clock a constant. Bit[1] and Bit[2] are the inverted signals of data and Bit[0]. This makes the total amount of 1's and 0's per clock a constant. While such a scheme may entail more overhead to embodiments discussed above, the additional bits offset both the static and dynamic power of the key transmission. In order to reduce the total number of wires needed for transmission of the data, key bit transmitted could be reduced to only one bit per clock cycle if desired. Of course, more bits could be transmitted if desired. If 1 bit of a 256 bit key is transmitted at each clock, then the total wires needed would be 1+3=4, and the total number of clock cycles needed to transmit the 256-bit key is 256 clocks. As key bit transmission is not generally performed frequently (e.g., only at system reset), then this 256 clock cycles may not be seen as problematic in terms of system performance.

FIG. 7 illustrates a block diagram of a portion of a system that addresses both static and power considerations as discussed above. As in previous examples, DBI logic 222 is shown. Included is logic 722 coupled to receive key data bit(s) 710. In the embodiment shown, only a single data bit is received during a given clock cycle (or multiple clock cycle basis as per the design). Logic 722 generates three additional data bits corresponding to the received data bit at a given time, t, as follows:

$$Bit[0](t)=\sim Bit[0](t-1)^\wedge(data(t)^\wedge data(t-1))$$

$$Bit[1](t)=\sim data(t)$$

$$Bit[2](t)=\sim Bit[0](t)$$

The following table illustrates the values of the above bits over the course of a number of clock cycles. As seen from the table below, during each clock cycle an equal number of 0 s and 1 s are transmitted. Further, two bits toggle on each clock cycle. In this manner, both the number of 1 s and 0 s transmitted, and the total amount of toggling, is addressed.

| Time | data | B[0] | B[1] | B[2] |
|------|------|------|------|------|
| 0 | 1 | 0 | 0 | 1 |
| 1 | 0 | 0 | 1 | 1 |
| 2 | 0 | 1 | 1 | 0 |
| 3 | 1 | 1 | 0 | 0 |
| 4 | 1 | 0 | 0 | 1 |
| 5 | 1 | 1 | 0 | 0 |
| 6 | 0 | 1 | 1 | 0 |
| 7 | 1 | 1 | 0 | 0 |
| 8 | 0 | 1 | 1 | 0 |
| 9 | 1 | 1 | 0 | 0 |

Subsequent to generating the bits B[0]-B[3], both the bits B[n] and data may be conveyed as data 770.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
   one or more electronic fuse arrays configured to store secure data; and
   logic configured to receive secure data from the one or more electronic fuse arrays via multiplexors and invert the secure data prior to transmission;
   wherein in response to detecting one or more bits of received secure data are to be conveyed from the one or more electronic fuse arrays, the logic is configured to:
   invert the one or more bits prior to conveyance if more than half of the one or more bits are a binary one value;
   set an inversion signal to indicate whether the one or more bits are inverted; and
   convey both the one or more bits and inversion signal to one or more flip flops to convey data representing the one or more bits and inversion signal.

2. The apparatus as recited in claim 1, wherein the secure data comprises encryption key data.

3. The apparatus as recited in claim 2, wherein the one or more electronic fuse arrays each store 128 bits of the encryption key data.

4. The apparatus as recited in claim 1, wherein data representing the one or more bits are conveyed via one or more first signal lines, and wherein data representing the inversion signal is conveyed via second signal lines.

5. The apparatus as recited in claim 1, further comprising a receiver coupled to receive the data representing the one or more bits and inversion signal conveyed by the one or more flip flops, and wherein in response to detecting the inversion signal indicates the one or more bits are inverted, the receiver is configured to invert the one or more bits to restore their original values.

6. The apparatus as recited in claim 1, wherein the logic is configured to detect the one or more bits of received secure data are to be conveyed from the one or more electronic fuse arrays responsive to detecting a reset or reboot of the apparatus.

7. A method comprising:
   receiving one or more bits of secure data from a one or more electronic fuse arrays;
   inverting the one or more bits prior to conveyance if more than half of the one or more bits are a binary one value;
   setting an inversion signal to indicate whether the one or more bits are inverted;
   conveying both the one or more bits and inversion signal to one or more flip flops; and
   conveying data representing both the one or more bits and the inversion signal from the one or more flip flops.

8. The method as recited in claim 7, wherein the secure data comprises encryption key data.

9. The method as recited in claim 8, wherein the one or more electronic fuse arrays each store 128 bits of the encryption key data.

10. The method as recited in claim 7, further comprising conveying the data representing the one or more bits via one or more first signal lines, and conveying the data representing the inversion signal via second signal lines.

11. The method as recited in claim 7, further comprising a receiver receiving the data representing the one or more bits and inversion signal, and in response to detecting the inversion signal indicates the one or more bits are inverted, inverting the one or more bits to restore their original values.

12. The method as recited in claim 11, wherein the data representing the one or more bits and inversion signal are conveyed from the one or more flip flops of a source to the receiver, wherein the source and receiver are part of a single integrated circuit.

* * * * *